US010970930B1

(12) United States Patent
Olsen et al.

(10) Patent No.: US 10,970,930 B1
(45) Date of Patent: Apr. 6, 2021

(54) ALIGNMENT AND CONCURRENT PRESENTATION OF GUIDE DEVICE VIDEO AND ENHANCEMENTS

(71) Applicant: Amazon Technologies, Inc., Seattle, WA (US)

(72) Inventors: Erik Jacob Olsen, Bellevue, WA (US); Celso Gomes, Seattle, WA (US); Ting-Hsiang Tony Hwang, Seattle, WA (US); Adam Meyer, Manhattan Beach, CA (US); Jeremy Jonas, Bothell, WA (US); Benjamin Schiffler, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/670,876

(22) Filed: Aug. 7, 2017

(51) Int. Cl.
*G06T 17/00* (2006.01)
*G06T 19/00* (2011.01)
*G06T 7/80* (2017.01)
G06F 3/16 (2006.01)
G06T 7/73 (2017.01)

(52) U.S. Cl.
CPC .............. *G06T 19/006* (2013.01); *G06T 7/80* (2017.01); *G06F 3/16* (2013.01); *G06T 7/74* (2017.01)

(58) Field of Classification Search
CPC ....... G06T 17/05; G06T 19/00; G06T 19/006; G06T 15/00; G06T 15/20
USPC .......................................................... 345/633
See application file for complete search history.

(56) References Cited

U.S. PATENT DOCUMENTS

| 5,876,339 | A | * | 3/1999 | Lemire | A61B 5/0091 |
| | | | | | 600/425 |
| 9,674,290 | B1 | | 6/2017 | Rincon et al. | |
| 9,824,490 | B1 | * | 11/2017 | Cote | G06T 17/05 |
| 9,881,425 | B1 | * | 1/2018 | Scott | G06T 19/006 |
| 2003/0229900 | A1 | | 12/2003 | Reisman | |
| 2004/0189675 | A1 | | 9/2004 | Pretlove et al. | |
| 2007/0167801 | A1 | * | 7/2007 | Webler | G06T 19/00 |
| | | | | | 600/459 |
| 2008/0101456 | A1 | | 5/2008 | Ridge et al. | |
| 2013/0083003 | A1 | | 4/2013 | Perez et al. | |
| 2014/0100996 | A1 | | 4/2014 | Klein et al. | |

(Continued)

OTHER PUBLICATIONS

Güven and Feiner, "Interaction Techniques for Exploring Historic Sites Through Situated Media," Proc. 3DUI '06 (Symposium on 3D User Interfaces), Alexandria, VA, Mar. 25-26, 2006, 1-10.*

(Continued)

*Primary Examiner* — Thomas J Lett
(74) *Attorney, Agent, or Firm* — Athorus, PLLC

(57) ABSTRACT

Described are systems and methods for aligning and concurrently presenting guide device video data of an environment and an enhancement corresponding to the environment. With the described implementations, users may virtually experience an environment at a destination location from their own user device and also concurrently view historical and/or future representations of that environment (enhancement) concurrently with current representations of the environment. The user may select the amount of the enhancement or the guide device video data that is presented to the user as part of the experience. Likewise, the guide device video data and enhancement remain aligned as they are presented to the user.

25 Claims, 13 Drawing Sheets

(56) References Cited

U.S. PATENT DOCUMENTS

| | | | |
|---|---|---|---|
| 2015/0127486 A1 | 5/2015 | Advani | |
| 2015/0346722 A1 | 12/2015 | Herz et al. | |
| 2016/0103437 A1 | 4/2016 | Alfredsson et al. | |
| 2016/0277802 A1 | 9/2016 | Bernstein et al. | |
| 2016/0349509 A1* | 12/2016 | Lanier | G02B 27/0172 |
| 2017/0041557 A1 | 2/2017 | Urich et al. | |
| 2017/0061693 A1 | 3/2017 | Kohler et al. | |
| 2017/0064154 A1 | 3/2017 | Tseng et al. | |
| 2017/0124713 A1 | 5/2017 | Jurgenson et al. | |
| 2017/0155725 A1 | 6/2017 | Rincon et al. | |

OTHER PUBLICATIONS

Vlahakis et al., "Archeoguide: An Augmented Reality Guide for Archaeological Sites", IEEE Computer Graphics and Applications, Sep./Oct. 2002, pp. 52-60.*

Karsch, K., Golparvar-Fard, M., Forsyth, D. 2014. ConstructAide: Analyzing and Visualizing Construction Sites through Photographs and Building Models. ACM Trans. Graph. 33, 6, Article 176 (Nov. 2014), 11 pages.*

Google Glass—Wikipedia, https://en.wikipedia.org/wiki/Google_Glass, downloaded from internet on Aug. 7, 2017, pp. 1-14.

Google Goggles—Wikipedia, https://en.wikipedia.org/wiki/Google_Goggles, downloaded from internet on Aug. 7, 2017, pp. 1-3.

Kinect—Wikipedia, https://en.wikipedia.org/wiki/Kinect, downloaded from internet on Aug. 7, 2017, pp. 1-15.

Microsoft HoloLens—Wikipedia, https://en.wikipedia.org/wiki/Microsoft_HoloLens, downloaded from internet on Aug. 7, 2017, pp. 1-8.

Samsung Gear VR—Wikipedia, https://en.wikipedia.org/wiki/Samsung_Gear_VR, downloaded from internet on Aug. 7, 2017, pp. 1-5.

Editor, "uZoom Launches LiveShopCast to Power Live Video Sales", Home Business Magazine, Aug. 30, 2017, https://homebusinessmag.com/businesses/ecommerce/uzoom-launches-liveshopcast-power-live-video-sales/, pp. 1-4.

URL: https://www.youvisit.com/ (Web Archive version dated Sep. 27, 2016, URL: https://web.archive.org/web/20160927064242/https://www.youvisit.com:80/), 7 pages.

* cited by examiner

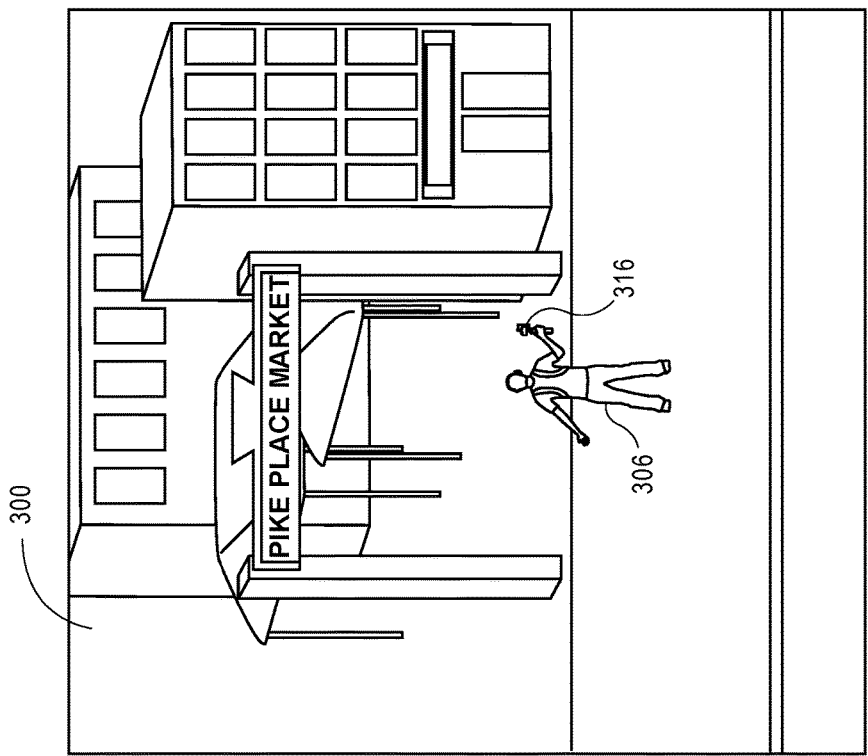
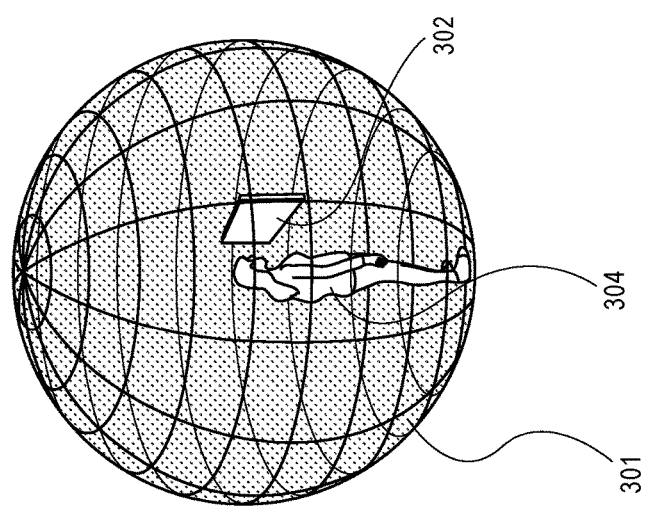
FIG. 3

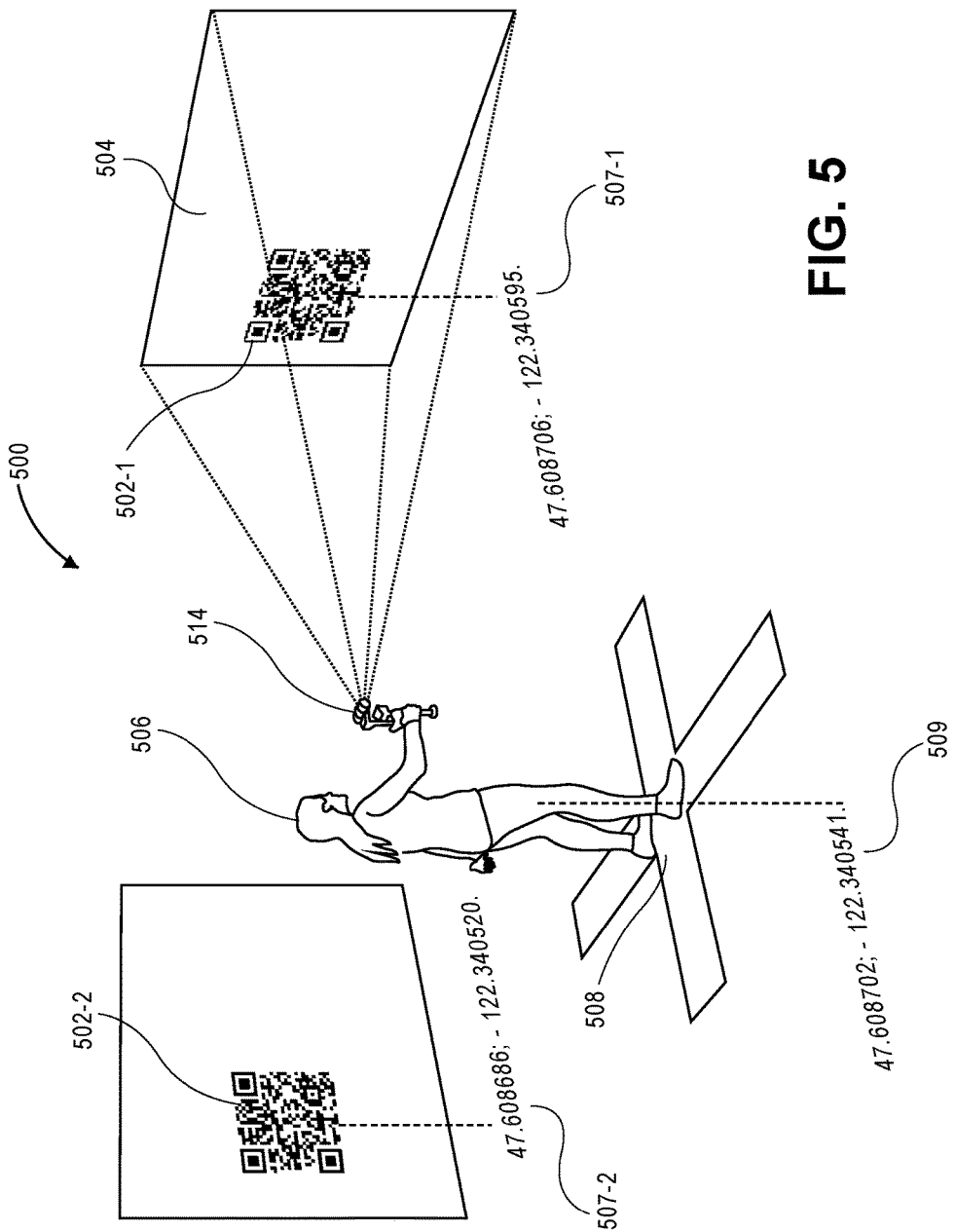

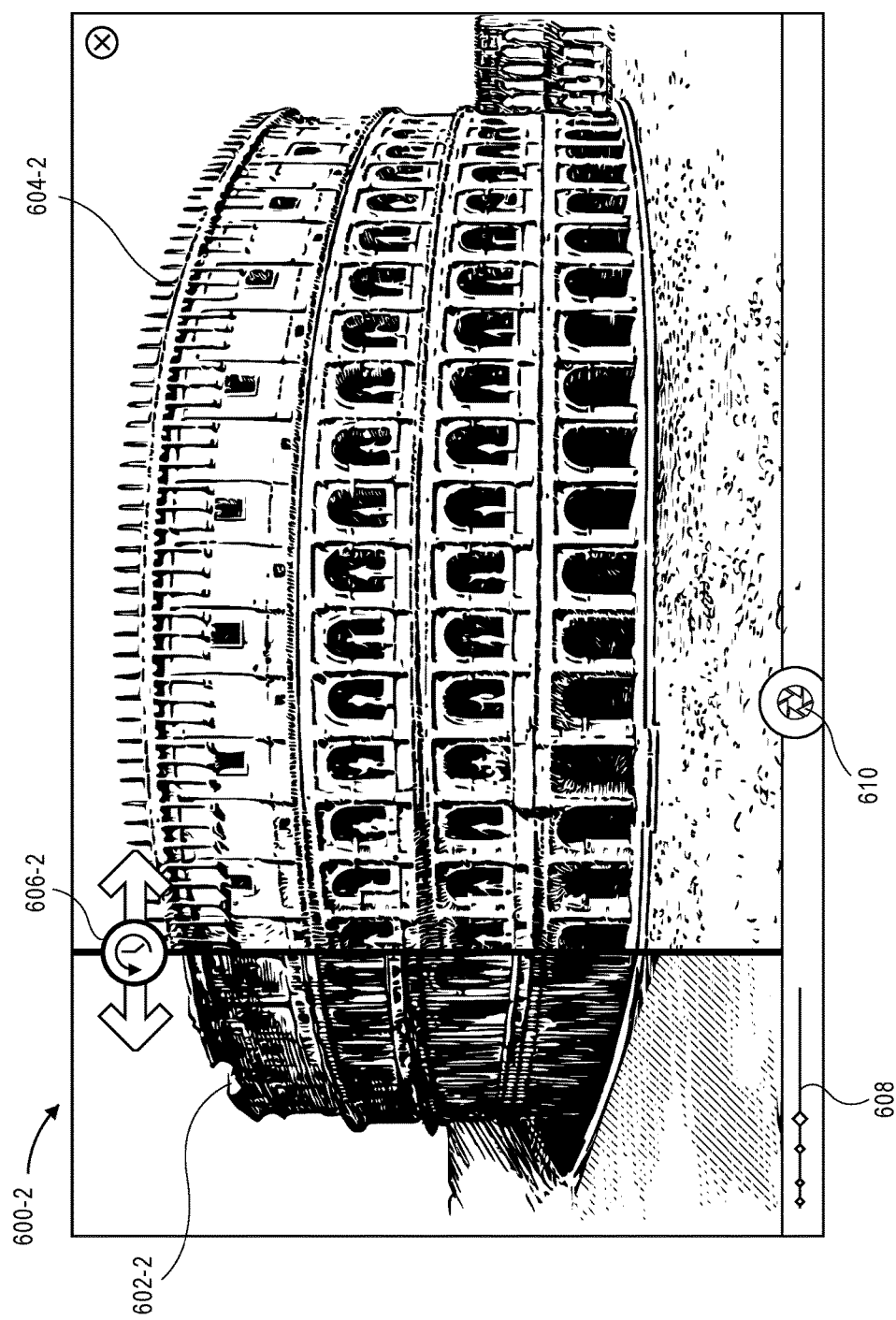

ALIGNMENT AND CONCURRENT PRESENTATION OF GUIDE DEVICE VIDEO AND ENHANCEMENTS

BACKGROUND

Our world and universe is full of wonderful places, history, and natural wonders that people enjoy learning about and experiencing. People even plan special vacations, save money, and take time off from work to physically travel from their home location to a destination, often just to learn about and experience that destination location. However, physically visiting different locations is often cost and/or time prohibitive for many people. Others experience and learn about different places in the world by reading about those places, watching videos, and/or watching live presentations about those locations. However, those types of experiences require that the individual be a passive observer, watching and learning based on the information that is provided. The individuals do not have the ability to participate in or control the experience.

BRIEF DESCRIPTION OF DRAWINGS

The detailed description is described with reference to the accompanying figures.

FIG. 3 illustrates how guide device video data from an environment at a destination location is assigned to different presentation parameters for presentation to a user, according to disclosed implementations.

FIG. 5 is a block diagram of an example technique for guide device video data and enhancement alignment, according to disclosed implementations.

FIGS. 6A-6B illustrate an example of presenting a mixed reality presentation on a user device that includes guide device video data of a destination location and an enhancement in the form of a visual mapping of the destination location, according to disclosed implementations.

DETAILED DESCRIPTION

Figure 1:
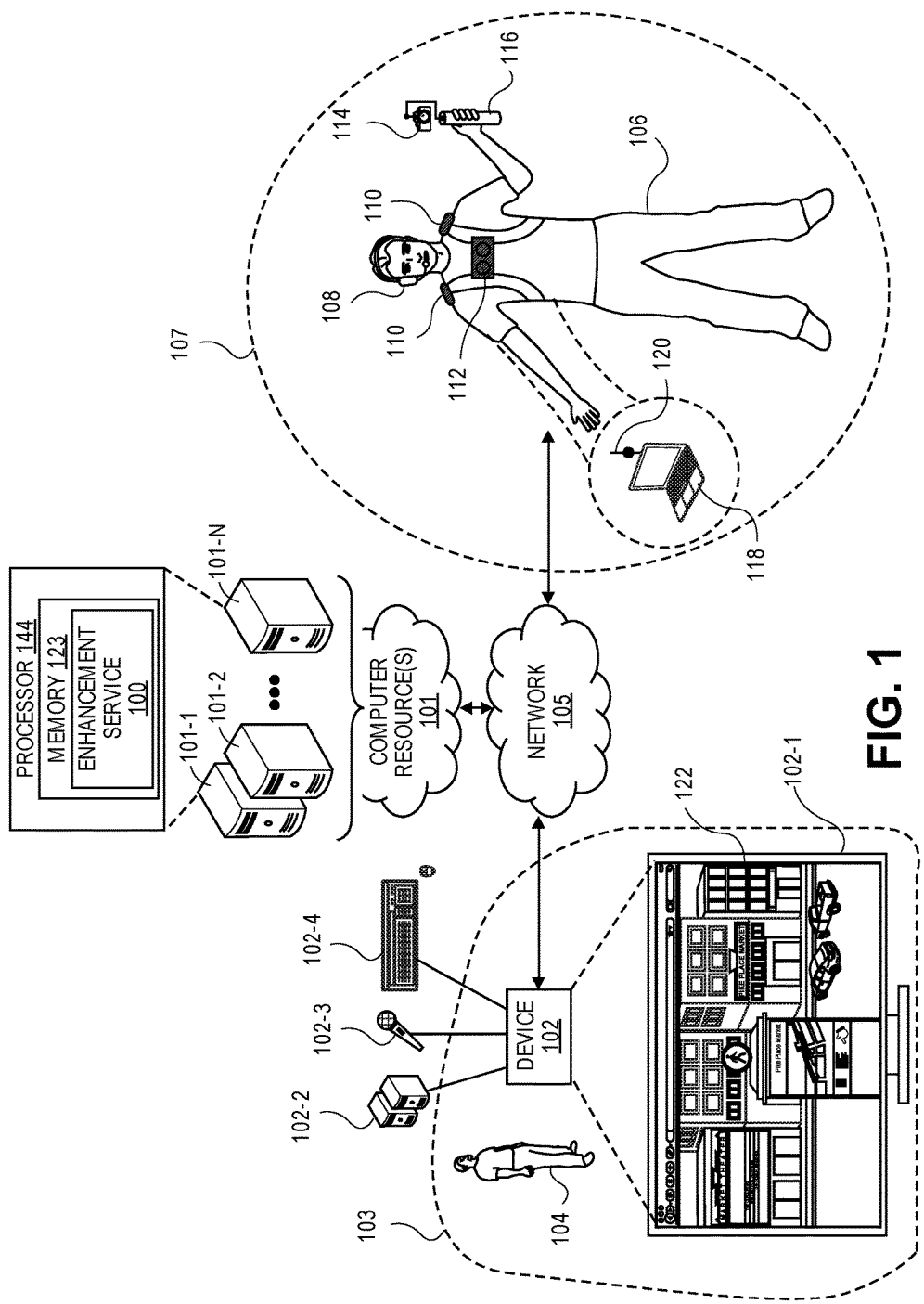
FIG. 1 illustrates an example environment in which guide transmitted environment information is augmented and presented to a user, according to disclosed implementations.

Described are systems, methods, and apparatus that enable users to experience an environment at a destination location from their own user device, control the experience and enhancements that are presented as part of the experience. In one implementation, a guide with a guide device may be physically located at a destination location. The guide device is configured to transmit at least guide device video data from the guide device to the user device, the user device being at any location that is remote from the destination location. An enhancement service, the guide device, or the user device, may process the guide device video data and align the guide device video data of an environment with one or more enhancements that are presented with the guide device video data. For example, an enhancement may include a visual mapping of the environment at the destination location and the guide device video data may be aligned with the visual mapping such that both the guide device video data and the visual mapping of the environment are presented concurrently by the user device.

In implementations where the guide device or the enhancement service generate the alignment between the guide device video data and the enhancement, the guide device video data may be sent to a user device along with alignment data and the enhancement (e.g., the visual mapping of the environment). The user device may concurrently present both the guide device video data and the enhancement such that both are aligned and viewable together. As discussed further below, an enhancement in the form of a visual mapping of the environment may represent the environment at a different point in time compared to the time at which the guide device video data is generated. By presenting the guide device video data and the visual mapping concurrently, the user can experience the difference between the environment as it is now, compared to how it used to be or how it could have been, or, as it is now compared to how it may be in the future.

The user can alter the displayed information to adjust the amount and/or type of enhancement that is presented with the guide device video data. For example, if the enhancement is a visual mapping of the environment from a different point in time, the user may adjust the amount of the visual mapping that is presented versus the amount of the guide device video data that is presented (collectively referred to herein as a mixed realty presentation, also referred to herein as augmented video data). In some implementations, the enhancement may be overlaid onto the guide device video data such that information from both the guide device video data and the enhancement appear together and combined into a single presentation. In other examples, the guide device video data and the enhancement may be presented aligned and adjacent so the user can experience a portion of the environment in real time or near real time, as presented by the guide device video data, and the environment from a different point in time, as presented by the enhancement. The user may also interact with the presentation and adjust the amount of the guide device video data versus the enhancement that is presented by the user device.

FIG. 1 illustrates an example environment in which guide transmitted environment information is augmented and presented to a user, according to an implementation. As illustrated, the guide 106 is located at a destination location 107, which may be any location in the world, or as our travel capabilities continue to expand, any location in the universe. The guide carries and operates a guide device. The guide device includes at least one imaging component 114, such as a digital camera, a video camera, or other form of imaging component, that may be controlled by commands sent from a user device 102 and/or controlled by the guide 106. In some implementations, the imaging component 114 may be an infrared camera, a thermal imaging camera, and/or other form of imaging component. The user 104 and the user device 102 are positioned at any location, such as a user location 103 that is separate and distinct from the destination location 107. In some implementations, the imaging component 114 may be mounted to a gimbal 116, such as a two or three-axis gimbal that is held or otherwise mounted to the guide. In other implementations, the imaging component 114 may be mounted to the guide. The imaging component 114 captures images of the destination location in the form of video data and transmits those images over a network 105 to the user device 102 and/or to the remote computing resources 101 for processing by the enhancement service 100.

The guide device may also include one or more microphones 110 for receiving audio input from sounds within the destination location, and one or more speakers 112 for outputting sound into the environment. For example, the user 104, using a microphone at the user device 102 may provide audio input (e.g., speech) that is transmitted via the network 105 to the guide device and output through the one or more speakers 112 of the guide device.

The guide device may also include a headset 108 that enables audio communication directly between the user 104 and the guide 106. As illustrated, the headset 108 may also include a speaker (or earphone) that is used to output audio to the guide 106, and a microphone that is used by the guide to communicate directly with the user 104. The microphone(s) 110 and/or the microphone of the headset 108 may be configured to capture sounds (e.g., utterances) from a user speaking, other sounds of the destination location, and/or sounds (e.g., utterances) of the guide. The audio signal/data may then be sent over the network 105 to the user device 102 and output through a speaker of the user device.

The guide device may also include a computing component 118, a transmitter/receiver, and an antenna 120. The antenna 120 enables wireless transmission (transmitting/receiving) between the guide device, the remote computing resources 101 and the user device 102. Additional details of an example guide device are discussed further below with respect to FIG. 8.

Transmission between the guide device, the user device 102, and/or the computing resources 101 may be via a network 105. The network 105 may include wired technologies (e.g., wires, USB, fiber optic cable, etc.), wireless technologies (e.g., RF, cellular, satellite, Bluetooth, etc.), and/or other connection technologies. The network 105 carries data between the guide devices, the remote computing resources 101, and one or more user devices 102. For example, the network 105 may carry video data and/or audio data from the guide device to the user device 102 so that the video data and/or audio data can be presented by the user device 102 to the user 104 in real time or near real-time. For example, the presentation 122 may be video data generated from the imaging component 114 of the guide device. The presentation 122 may include the video data, which may be augmented with one or more enhancements, as discussed further below. The presentation may be displayed on a display 102-1 of the user device 102, projected by a camera of the user device, output audibly using speakers 102-2 of the user device 102, etc.

In some implementations, video data and/or audio data from a guide device may be transmitted to multiple user devices. For example, video data and/or audio data from the guide device may be transmitted over the network 105 to the computer resources 101 and the computer resources may send the video data and/or audio data to the user device 102 and one or more other user devices. Likewise, the enhancements used to augment the video data may be different for different users and/or different user devices. For example, a first set of enhancements may be used to augment video data that is presented to the user 104 via the user device 102 and a second set of enhancements may be used to augment video data that is presented to a second user via a second user device. As discussed below, the video data from the guide device may be augmented with the different enhancements at the guide, at the enhancement service 100 and/or at the user device(s) 102. For example, the enhancement service 100 may generate first augmented video using video data from the guide device and enhancements corresponding to a first user 104 that is sent to the first user device 102 for presentation to the first user 104. The enhancement service 100 may likewise generate second augmented video using the video data from the guide device and using enhancements corresponding to a second user that is sent to a second user device for presentation to the second user. As will be appreciated, any number of augmented videos may be generated using video data from the guide device, different enhancements from different enhancement sets, and sent to any number of user devices. Likewise, in some implementations, the same augmented video may be sent to more than one user device.

As illustrated, the remote computing resources 101 may include one or more servers, such as servers 101-1, 101-2, . . . , 101-N. These servers 101-1-101-N may be arranged in any number of ways, such as server farms, stacks, and the like that are commonly used in data centers. Furthermore, the servers 101-1-101-N may include one or more processors 144 and memory 123 which may store the enhancement service 100 and execute one or more of the processes or features discussed herein.

The user device 102 may be any type of device that is capable of receiving and presenting video data, audio data, and enhancements to a user 104 and that is capable of transmitting control instructions to the guide device to control the imaging component 114 of the guide device. For example, the user device 102 may be a cellular phone, smart phone, desktop, laptop, and/or any other form of computing device. The user device 104 may be configured to include, among other components, a display 102-1, such as a touch-based display, one or more speakers 102-2, one or more microphones 102-3, and/or one or more interface components such as a mouse or keyboard 102-4. The speakers output sounds transmitted from the guide device to the user device 102. The microphone(s) 102-3 capture sounds (e.g., utterances) from a user 104 speaking. Those sounds are converted into audio signals, transmitted over the network 105 to the guide device and output through the guide's 106 headset 108 and/or the speakers 112. The interface components, such as the mouse and keyboard 102-4 may be used to control the orientation of the imaging component 114 of the guide device. For example, the user 104 may utilize an interface component to input direction or orientation commands that are transmitted over the network 105 to the guide device and used to control or alter the position or orientation of the imaging component 114.

Figure 2:
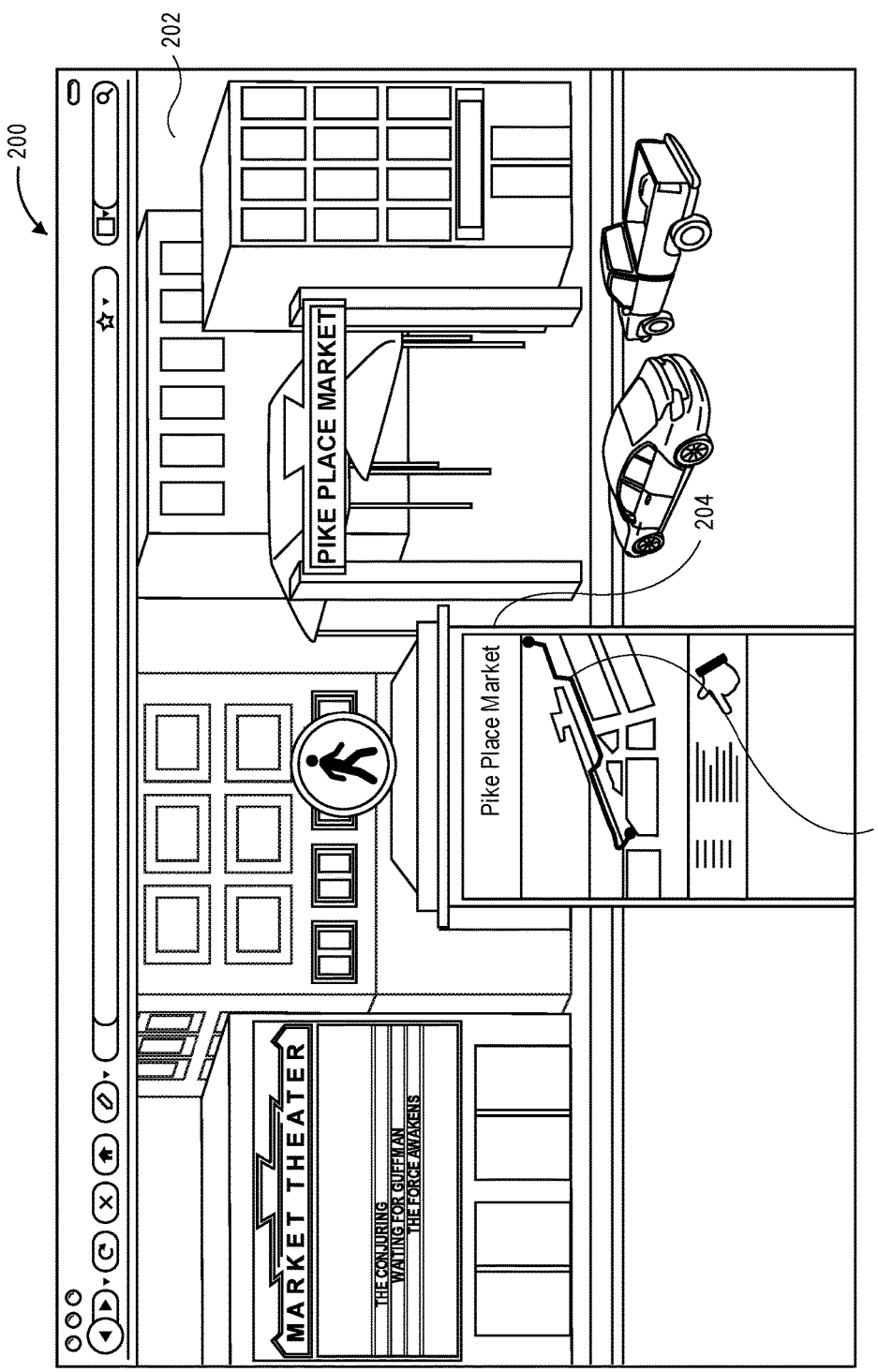
FIG. 2 illustrates an example of augmented video data presented by a user device, according to disclosed implementations.

As video data is captured by the imaging component 114 of the guide device, the video data is processed to determine if the video includes one or more markers. As discussed further below, processing of the video may be done by the computing component 118 of the guide device, by the enhancement service 100 operating on the remote computing resources 101, by the user device 102, and/or by a combination of two or more of the computing component 118 of the guide device, the enhancement service 100, and the user device 102. For example, FIG. 2 illustrates an example of augmented video data 200 presented by a user device, according to an implementation. In this example, video data 202 is generated with an imaging component of a guide device and processed using one or more image processing techniques to determine if a marker is present in the video data.

For example, one or more object detection algorithms, edge detection algorithms, etc. may be used to detect objects in the video data and those objects may be compared with a plurality of stored marker information corresponding to markers within the destination location. In some implementations, objects in video data may be detected using the Scale-Invariant Feature Transform (SIFT) algorithm and the detected objects compared with marker information maintained in a data store. If a detected object corresponds with a marker, the marker is determined and one or more enhancements associated with the marker may be selected and used to augment the video data presented by the user device.

In the example illustrated in FIG. 2, the video data 202 includes a marker 204 in the form of a map sign of Pike Place Market. As the video data is processed, the marker 204 is detected and an enhancement 206 is rendered and presented to augment the video data 202 to produce augmented video data 200. In this example, the enhancement 206 illustrates an intended route through Pike Place Market that will be followed by the guide as part of the experience for the user that is receiving data from the guide device. The enhancement 206 is rendered at a size and position based on the determined size and position of the marker 204 so that the enhancement 206 is presented in a manner consistent with the video data 202. Specifically, in this example, the enhancement 206 appears to overlay the map of Pike Place Market to illustrate to the user the route planned for the guide. However, as noted above, because the user has the ability to communicate and provide instructions to the guide, the planned route illustrated by the enhancement 206 may not be the route actually followed by the guide. The planned route may correspond to an area of known interest within the destination location, areas that include enhancements, etc. The user may request that the guide follow a route other than the planned route.

As discussed further below, the enhancement 206 is presented with the video data 202 and the position of the marker represented in the video data may be monitored. If the position and/or size of the marker moves, for example, in response to the guide or the imaging component of the guide device moving, the position and/or size of the enhancement will be updated so that enhancement continues to be presented with the video data in an appropriate manner. In other implementations, the enhancement may not be registered to a specific marker represented in the video and if the imaging component or the guide move, the enhancement will continue to be presented. For example, an enhancement may be associated with a direction or orientation of the imaging component of the guide device and as long as the imaging component is oriented in that direction, the enhancement will be rendered and presented. For example, an enhancement in the form of local weather conditions may be rendered and presented anytime the imaging component of the guide device is oriented upward a defined amount (e.g., oriented toward the sky). When the imaging component is oriented upward by the defined amount, the enhancement is rendered and presented. As another example, an enhancement in the form of a planned route and/or map of the environment in which the guide is located may be rendered and presented anytime the imaging component of the guide device is oriented downward a defined amount (e.g., oriented toward the ground).

FIG. 3 illustrates how guide device video data from an environment at a destination location 300 is assigned to different presentation parameters for presentation to a user 304, according to disclosed implementations. As discussed above, a guide 306 may be located at a destination location 300 and generate guide device video data using an imaging component 316 of the guide device. The guide device video data may then be transmitted to a user device and/or one or more remote computing resources, as discussed above. A user, such as user 304, may then virtually experience the destination location 300 as the guide device video data and any enhancements are presented to the user 304.

To align enhancements with the guide device video data, pixels of the guide device video data may be assigned to a three-dimensional position along a sphere 301 that virtually surrounds the user 304, or other virtual arrangement, based on the position of the imaging component 316 of the guide device. For example, the current guide device video data generated by the imaging component 316 may be associated with the portion of the sphere 301 that is presented on the display of the user device. In some implementations, the guide device video data may include more video data of the destination location than is presentable on the user device. For example, the imaging component 316 may be a three-hundred-sixty-degree camera ("360 camera") that generates guide device video data of the destination location from all, or almost all directions. In such an example, the guide device video data may be assigned to different positions on the virtual sphere 301 and the user 304 may dynamically adjust the field of view using one or more inputs of the user device to view different portions of the destination location 300.

In addition, a headlock display or head's up display 302 may also be generated and presented to the user 304 as part of the experience. The head's up display 302 may present information to the user regardless of the portion of the destination location 300 that the user is viewing. For example, the head's up display 302 may present an overview map, timeline, time of day, location information corresponding to the destination location, controls (e.g., camera control), etc. For example, referring briefly to FIG. 6A, the head's up display may include the camera control 610, timeline 608, etc. The camera control 610, and timeline 608 are discussed further below with respect to FIGS. 6A-6B.

Figure 4A:
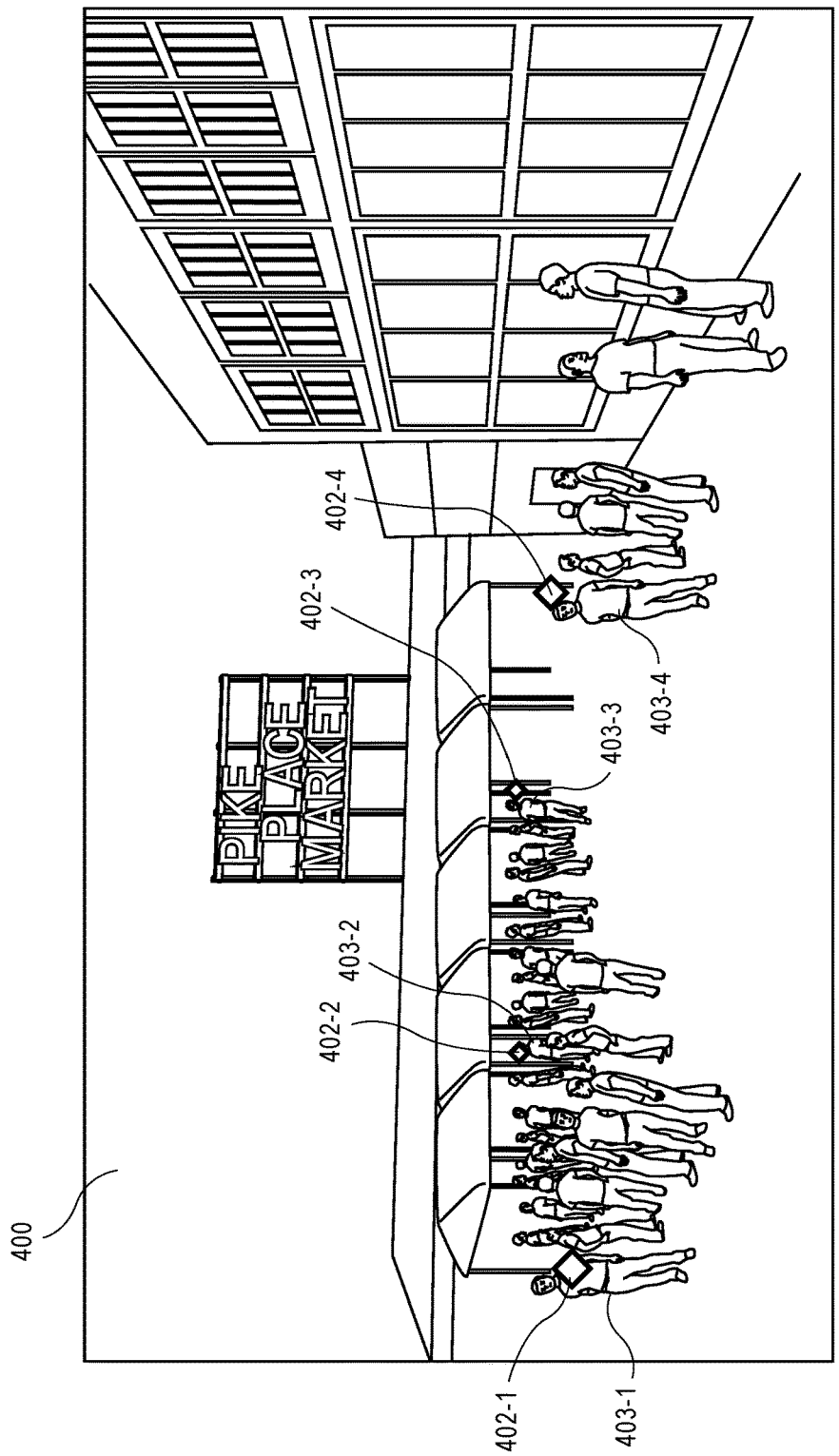
FIGS. 4A-4D illustrate an example of guide device video data sent from a guide device at a destination location and presented by a user device that includes enhancements related to the destination location to form augmented video data, according to disclosed implementations.

Returning to FIG. 3, by assigning each pixel of the guide device video data to a three-dimensional position along the virtual sphere, enhancements may also be rendered and assigned to some of those three-dimensional positions and presented concurrently and in alignment with the guide device video data to enhance the presented guide device video data. For example, Referring to FIG. 4A, illustrated is an example of guide device video data 400 sent from a guide device at a destination location and presented by a user device that includes enhancements 402 related to the destination location, according to disclosed implementations. In this example, the presented guide device video data 400 includes a view of Pike Place Market and patrons within Pike Place Market. The enhancement service has processed the guide device video data using one or more facial recognition algorithms to detect patrons within Pike Place market that are known. For each known patron, an enhancement 402 is aligned with a position of the patron and associated with the same or similar three-dimensional positions along the virtual sphere as the pixels that are representative of those patrons. Likewise, for patrons or other objects that are physically closer to the guide, the enhancement may be presented larger than for patrons that are physically farther from the guide. For example, enhancement 402-1 corresponds to a patron 403-1 that is closer than any of the other identified patrons 403-2, 403-3, and 403-4. As such, the enhancement 402-1 corresponding to patron 403-1 is presented larger than the enhancements 402-2, 402-3, and 402-4 corresponding to patrons 403-2, 403-3, and 403-4.

Figure 4B:
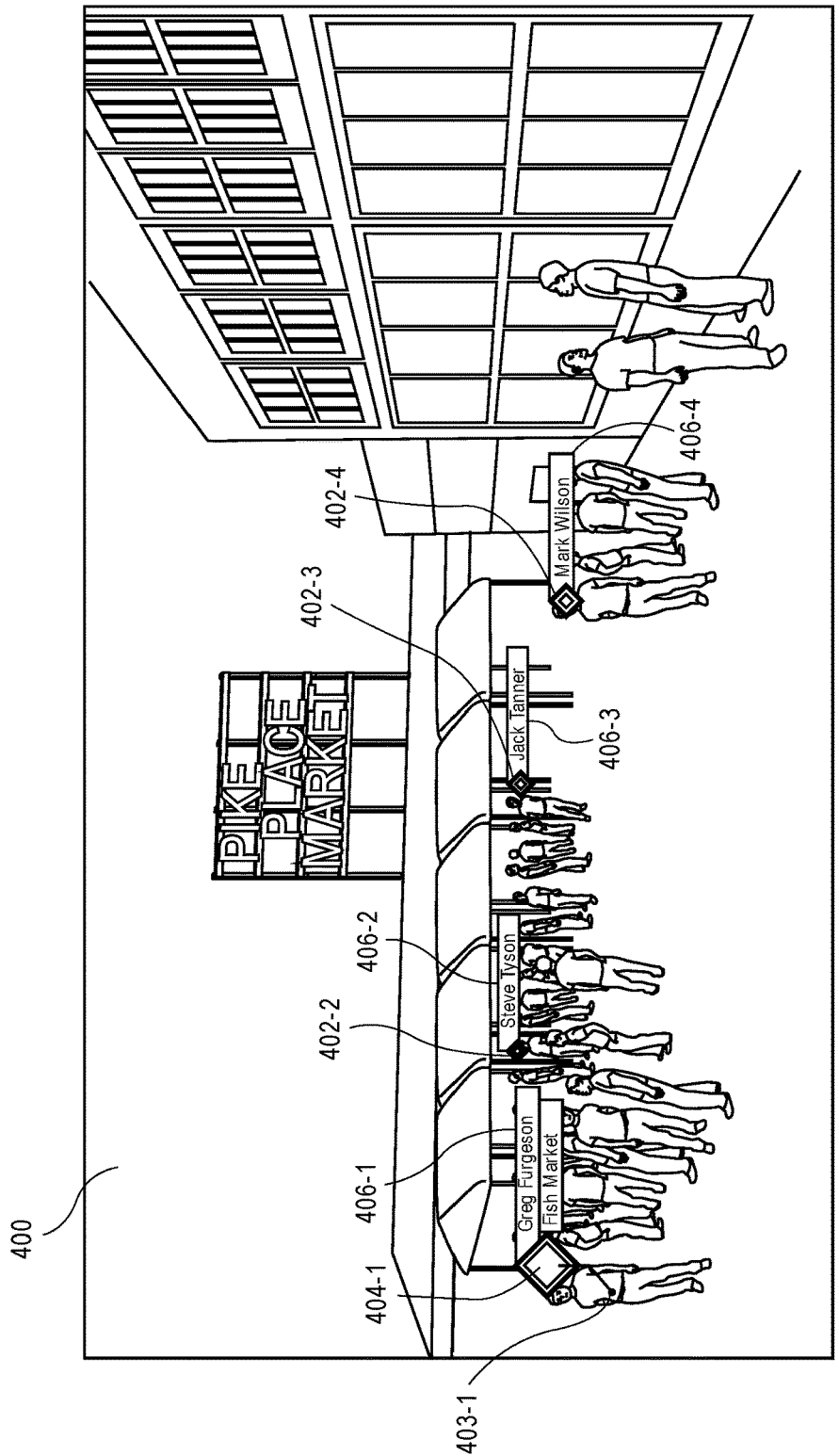

A user viewing the guide device video data 400 and presented enhancements 402 may select to interact with one or more of the enhancements to obtain additional information about the object to which the enhancement corresponds. For example, as illustrated in FIG. 4B, the user has selected to receive overview information 406 relating to the enhancements 402. In this example, the overview information provides additional information about the objects, in this example the patrons 403. In addition, similar to presenting a larger enhancement for objects that are closer to the guide, more additional information 406 may be presented for objects that are closer to the guide. In this example, additional information 406-1, which corresponds to patron 403-1 includes the name of the patron "Greg Furgeson" and the location of the patron, in this example "Fish Market." In comparison, the additional information 406-2, 406-3, and 406-4 may only identify the object, for example the names of the patrons "Steve Tyson," "Jack Tanner," and "Mark Wilson," respectively.

Figure 4C:
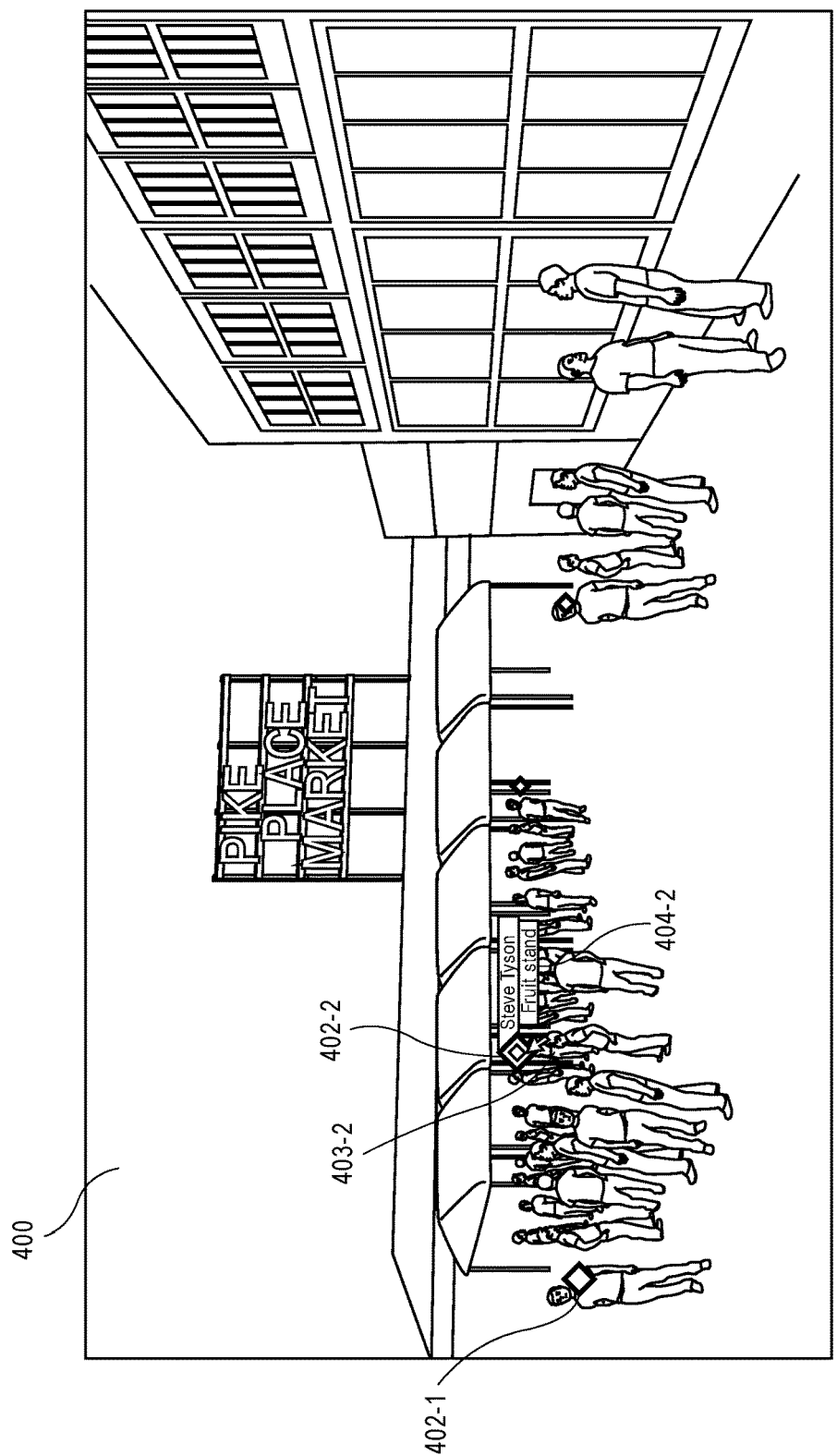

A user may also select to obtain additional information corresponding to any of the enhancements. For example, referring to FIG. 4C, the user has selected to obtain additional information corresponding to object 403-2 and receives additional information 404-2 indicating the name of the object, in this example the patron's name, "Steve Tyson," and the location of the object, in this example, "Fruit stand." To receive the additional information 404-2 corresponding to an enhancement 402, the user may interact with the enhancement, such as enhancement 402-2, to receive the additional information 404.

Figure 4D:
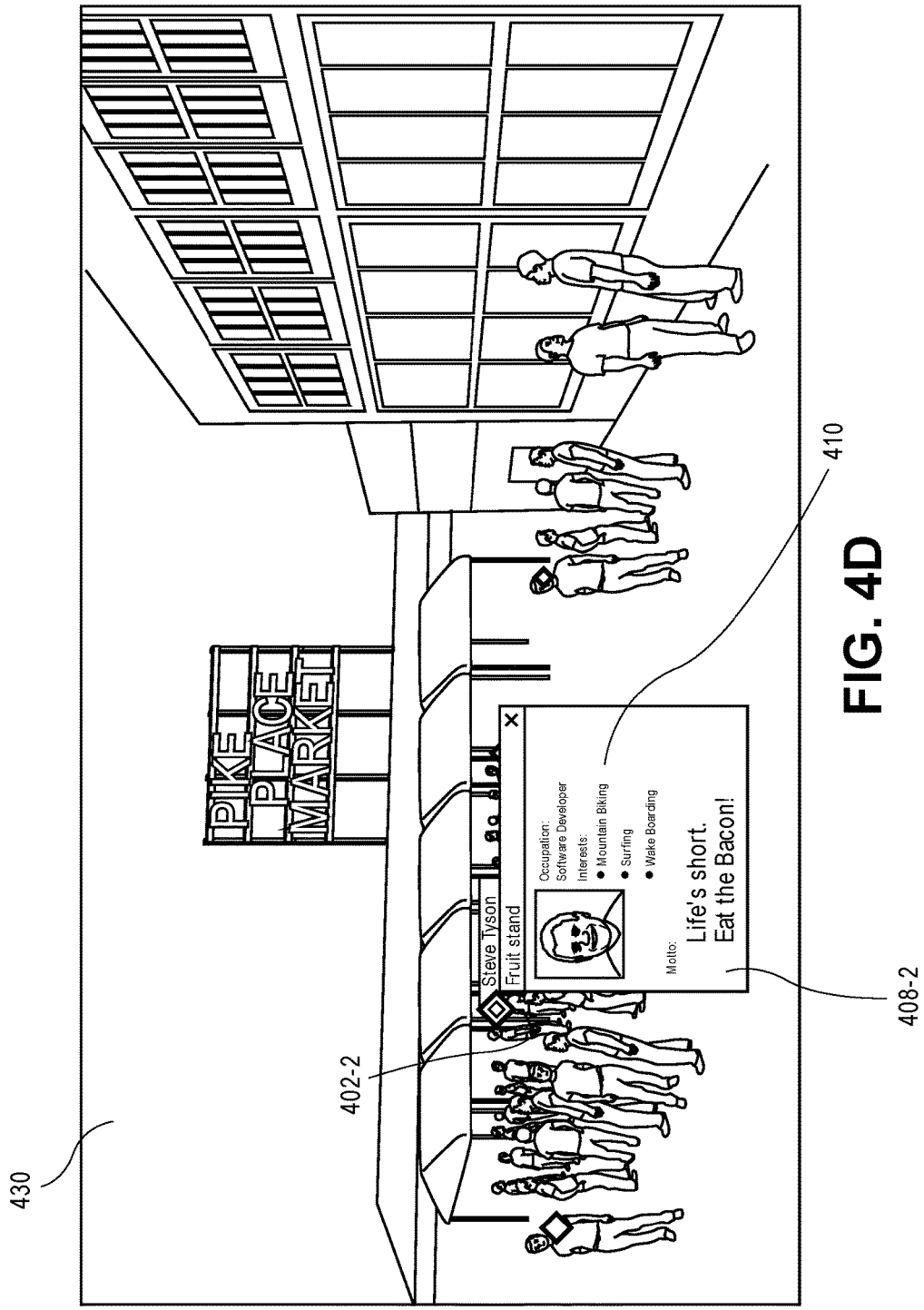

As will be appreciated, different levels of additional information may be presented to the user in response to the user selecting one or more enhancements. For example, referring to FIG. 4D, illustrated is a different amount of additional information presented to the user in response to the user selecting the enhancement 402-2 corresponding to object 403-2, in this example the patron "Steve Tyson." In this example, the additional information 408-2 includes an image of the object (the patron) and details 410 about the object. Any variety of details 410 may be included in the additional information and the user may specify the level of details 410 that are to be provided.

In addition to presenting the additional information, if the objects and/or the guide move such that that the pixels representative of those objects change, the position of the object is updated on the virtual sphere surrounding the user and the enhancement associated with the object is also updated. By monitoring and processing the guide device video data, rendering and aligning the enhancements with the guide device video data, and updating the position of the pixels of the guide device video data with respect to the three-dimensional space of the sphere, the enhancements corresponding to any object represented in the guide device video data can likewise but quickly updated and presented at the corresponding positions on the virtual sphere so they appear aligned with the object represented in the guide device video data.

In some implementations, specific alignment of the imaging component and the environment of the destination location may be desirable to align at a higher level of detail the enhancements with the guide device video data. Referring to FIG. 5, illustrated is a block diagram of an example technique for guide device and enhancement alignment, according to disclosed implementations. In this example, a guide 506 positions themselves at a known location 508 within a destination location and orients the imaging component 514 such that the field of view 504 of the imaging component includes a marker 502-1 that is at a known position within the environment 500 of the destination location. In some implementations, the position information 509, such as a latitude, longitude, and/or an altitude of the known location 508 may be stored in a memory of the guide device and/or the memory of the enhancement service. Likewise, the position information 507-1 of the marker, such as a latitude, longitude and/or altitude of the marker 502-1 may be known and stored in a memory of the guide device and/or the memory of the enhancement service.

When the guide 506 is positioned at the known location 508 and has the imaging component 514 oriented toward the marker, the guide may initiate an alignment process that will cause the guide device video data to be processed to detect the marker 502-1 represented in the guide device video data. The alignment process may be performed by the imaging component 514, the guide device, and/or by the enhancement service. The initiation of the alignment process may be invoked by the guide providing an audible command or activating an alignment control. In other implementations, the alignment process may be continual and upon determination that the guide is at the known location 508 and the field of view 504 of the imaging component 514 includes the marker 502-1, the alignment process may be performed.

In some implementations, the guide 506 may, while positioned at the location 508, orient the imaging component 514 toward multiple markers that are at know positions. For example, subsequent to aligning the imaging component 514 such that the field of view 504 includes the marker 502-1 and obtaining an image that includes a representation of the marker 502-1, the guide 508 may then align the imaging component 514 such that the field of view includes a second marker 502-2 that is at a known location, as illustrated by position information 507-2, and obtain image data that includes a representation of the second marker 502-2. In some implementations, the field of view may encompass multiple markers 502 such that the guide 506 need not re-orient the imaging component 514. For example, if the imaging component 514 is a 360-degree camera, the field of view 504 may simultaneously include both markers 502-1, 502-2.

As will be appreciated, any number of images of marker(s) and any number of markers may be imaged as part of an alignment process. In addition, while the guide and the imaging component are positioned at the location 508, other information, such as the orientation, GPS information, altitude, angle, etc., of the imaging component 514 may also be recorded and considered as an input to determining alignment for enhancements.

As discussed further below, the alignment process may include processing the guide device video data to determine pixels within the guide device video data that represent the marker(s) 502. Likewise, the position (e.g., latitude, longitude, and/or altitude) and actual size of the marker as represented in a stored enhancement, such as a visual mapping of the environment of the destination location, may be known and stored in memory. Upon determining the pixels of the guide device video data that represent the marker(s) when the guide and imaging component are at the known location 508, the pixels are associated with the known position and size of the marker(s) as represented in the enhancement. By associating the pixels of the guide device video data with the position of the marker(s) as known and represented in the enhancement, the guide device video data and the enhancement can be aligned at a pixel level. Likewise, the position of the marker(s) in the guide device video data is also associated with the real-world position of the marker(s), as known and stored in memory as position information 509 of the known location 508 and the position 507-1 of the marker(s) 502.

By aligning the guide device video data, enhancement, and the real-world position, alignment data is generated that may be used to align the guide device video data and rendered enhancements as the enhancements are presented on the user device. For example, the guide device video data, enhancement and the alignment data may be transmitted to the user device and the user device may utilize the alignment data to align the presented portion of the guide device video data and the enhancement.

In some implementations, the GPS position of the guide device and/or the guide, the position of the guide device and/or the guide as determined by an indoor positioning system, or the position of the guide device and/or the guide as determined other positioning system(s) may also be determined and used as additional factor(s) in creating alignment data. Likewise, while the above discussion with respect to FIG. 5 describes determining the position of the imaging component 514, utilizing the position of the guide device, or, more specifically, the position of a positioning component (e.g., IMU or GPS) may be used as the position of the imaging component.

Figure 6A:
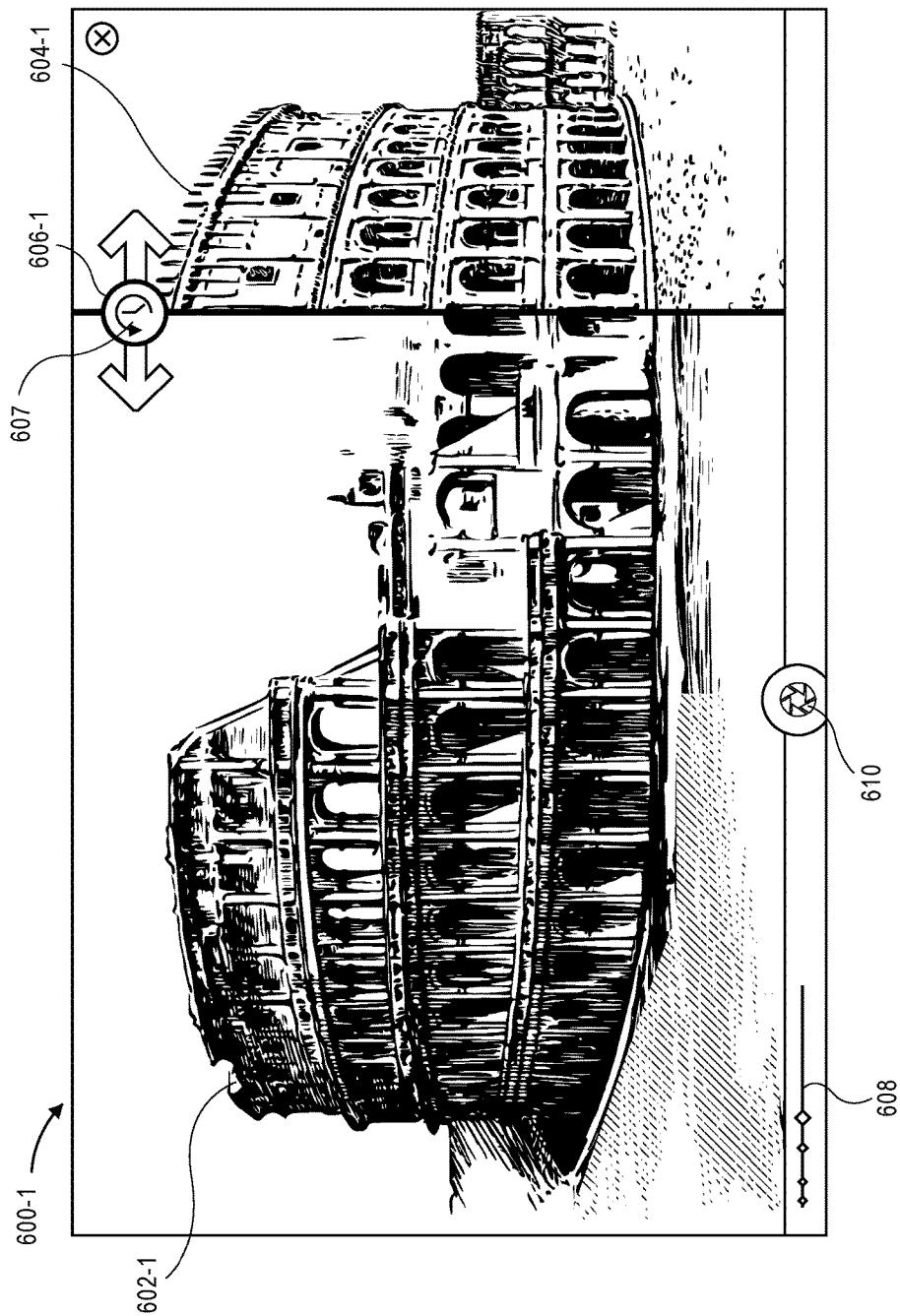

FIGS. 6A-6B illustrate an example of presenting a mixed reality presentation 600, also referred to herein as augmented video, on a user device that includes guide device video data 602-1 of a destination location and an enhancement 604-1 in the form of a visual mapping of the destination location, according to disclosed implementations. In the illustrated example, the presented guide device video data 602-1 is a current representation of the Roman Coliseum as captured by a guide device located at the coliseum. In addition, the enhancement 604-1, in this example a visual mapping of the Roman Coliseum as it existed during the height of the Roman empire, is aligned with the guide device video data 602-1 and presented adjacent the guide device video data 602-1.

By aligning and presenting the guide device video data 602-1 and the enhancement 604-1 concurrently, the user is presented with a mixed realty environment that allows the user to experience and compare the destination location as it currently exists and as it existed at a different point in time. The different point in time may be a historical point in time as the destination location actually existed (or is believed to have existed or could have existed) or a future point in time as the destination location is predicted to exist, or may exist.

The user may interact with the presentation 600-1 to adjust the amount of the enhancement that is presented concurrently with the guide device video data 602-1, to capture images of the guide device video data and/or the enhancement for later review and retrieval, to provide instructions to the guide, to terminate a presentation of the enhancement, etc. For example, a user viewing the presentation 600-1 may adjust the amount of the enhancement 604-1 that is presented by interacting with the adjustment control 606-1. Likewise, the user may alter the enhancement by selecting the time control 607. For example, if the user selects the time control 607, the user may be presented with options for different enhancements that may be aligned and presented concurrently with the guide device video data 602-1. Alternatively, the user may move the time control 607 vertically to alter the presented enhancement. The other enhancements may include visual mappings of the destination location at different points in time, with different amounts of detail, etc.

The user may obtain images of the guide device video data and/or the enhancement by selecting the camera control 610. Upon selection of the camera control, the current presentation 600-1 may be rendered as a digital still image and stored in a memory for later retrieval and viewing by the user. In addition, the timeline 608 may indicate to the user locations or times during the experience that the user has captured images of the presentation.

If the position of the guide device moves, because the position of the enhancement has been correlated with a real-world position and the position of the pixels of the guide device video data, the alignment between the guide device video data and the presented enhancement may be maintained, even if the marker is no longer in the field of view of the guide device. For example, as the guide device is repositioned, the position of the pixels of the guide device may likewise be updated based on the known position and alignment of the enhancement, detected movement of the guide device, and/or based on detection of other markers within the field of view of the guide device.

FIG. 6B illustrates another view of the presentation 600-2 after the user has interacted with the adjustment control 606-2 to adjust the amount of the enhancement that is presented by the user device. In this example, the user has moved the adjustment control 606-2 to increase the amount of the enhancement 604-2 that is presented and to reduce the amount of the guide device video data 602-2 that is presented. As illustrated, because the guide device video data and the enhancement are aligned, adjustment of the amount of the two that are presented is a seamless experience for the user and allows the user to experience a mixed reality environment that compares the destination location as it currently exists with the destination location as it existed or may exist at another point in time.

The enhancement, which in this example is a visual mapping of the destination location, may be a digital image or rendering of the destination location, a video of the destination location, information about the destination location, etc. Likewise, while this example shows the enhancement presented adjacent or over the guide device video data, in other implementations, the enhancement may be presented with the guide device video data such that they both appear together providing a combined mixed reality environment.

Figure 7:
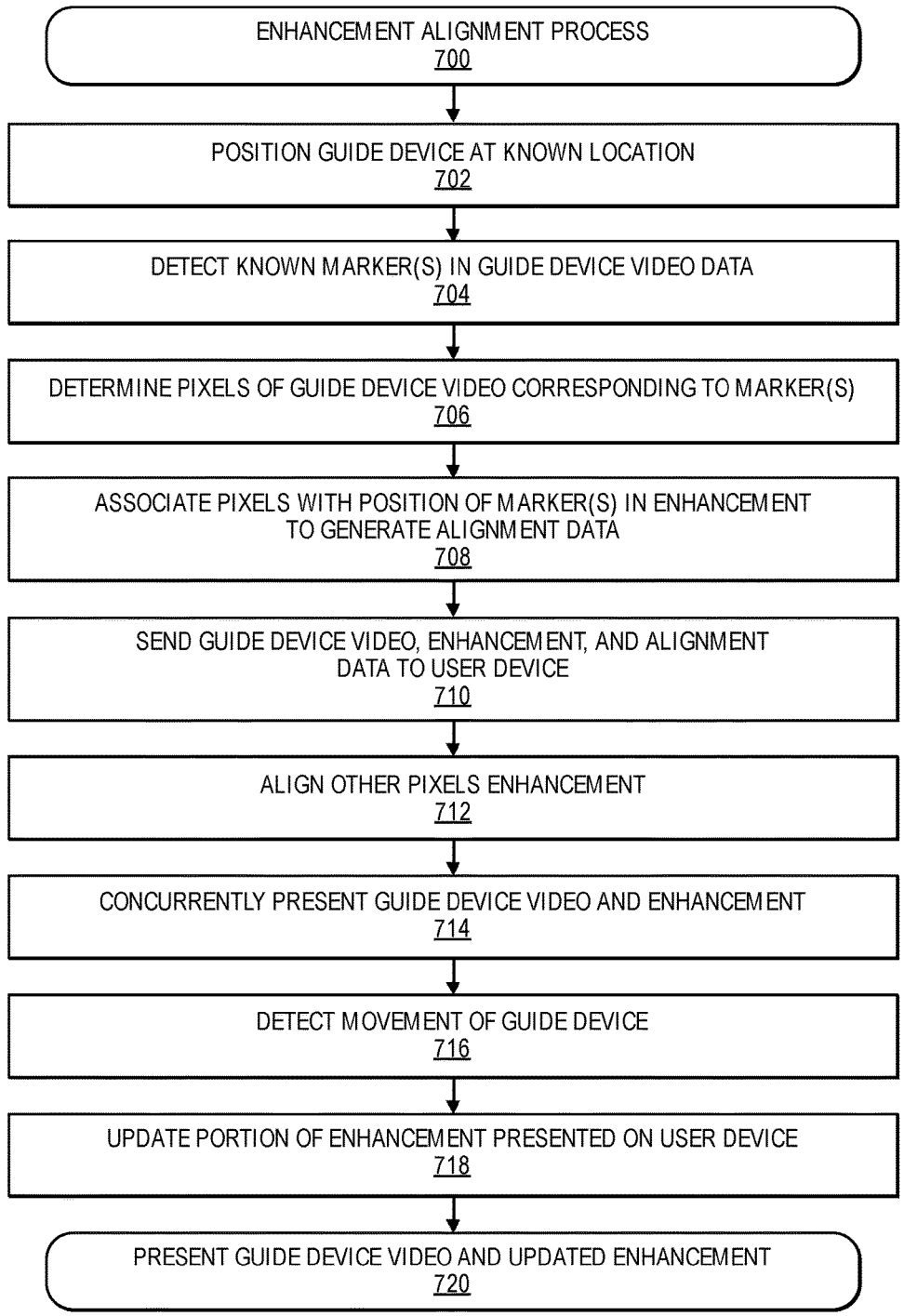
FIG. 7 illustrates an example enhancement alignment process, according to disclosed implementations.

FIG. 7 illustrates an example enhancement alignment process 700, according to disclosed implementations. The example process 700 begins by positioning the guide device at a known location, as in 702. As discussed above, one or more known locations may be maintained for a destination location. The position (e.g., longitude, latitude, and/or altitude) of the known location may be maintained in a memory of the guide device and/or the enhancement service.

Upon positioning of the guide device at a known location within the destination location and orienting the guide device toward a position of one or more known markers within the destination location, the guide device video data generated by the guide device while the guide device is positioned at the known location is processed to detect a representation of each of the one or more known markers in the guide device video data, as in 704. For example, one or more image processing algorithms, such as an object detection algorithm, edge detection algorithm, etc., may be used to process the guide device video data to detect the marker(s) represented in the guide device video data. Because the size, shape, and/or other information about each of the one or more markers is known, the processing of the guide device video data may be performed quickly and with limited processing requirements as the guide device video data may only be processed to detect characteristics of the known marker(s).

Upon detecting the known marker(s) in the guide device video data, pixels of the guide device video data that are representative of the marker(s) are determined, as in 706. As is known in the art, pixels may be addressed by row:column within the guide device video data.

The size and position of the marker(s), as represented in the enhancement to be aligned, is also known. Accordingly, the pixels of the guide device video data determined to represent the marker(s) are associated with the known position of the marker(s), as represented in the enhancement, and used to generate alignment data, as in 708. The alignment data may include an indication of the real-world position represented by the pixels and/or the position of the pixels as represented in the enhancement. In addition to pixel alignments, the alignment data may also indicate the orientation and/or translation of the guide device, an enhancement identifier, and/or a guide device video data frame indicator indicating a frame in the guide device video data for which the enhancement is to be rendered and aligned.

Upon determination of the alignment data, the guide device video data, enhancement, and the alignment data are sent to the user device for presentation to the user, as in 710. In some implementations, each of the guide device video data, enhancement, and alignment data may be sent by the guide device and/or the enhancement service to the user device. In other implementations, the guide device video data may be sent directly from the guide device to the user device and the enhancement and/or alignment data may be sent by the enhancement service.

Based on the alignment data, the pixels of the guide device video data and the enhancement are aligned by the user device, as in 712. As the guide device video data and enhancement are aligned, at least a portion of the guide device video data and at least a portion of the enhancement are concurrently presented by the user device, as in 714. As discussed above, the concurrent presentation of aligned guide device video data and the enhancement provides the user with a mixed reality experience of the destination location.

As the guide device video data and the enhancement are concurrently presented, a movement of the guide device may be detected, as in 716. For example, if the pixel representations change it may be determined that the guide device and/or aspects of the destination location have moved. Alternatively, or in addition thereto, position information corresponding to the guide device may be used to detect a movement of the guide device.

Upon detection of a movement of the guide device, the portion of the enhancement that is aligned and presented with the guide device video data is updated so that the enhancement continues to be aligned with the guide device video data as it is presented to the user, as in 718. The position of the enhancement may be updated based on the previously received alignment data by updating the relationship of pixels of the guide device video data with different real-world position information and/or with the position of the enhancement. Finally, as the portion of the enhancement is updated and the alignment maintained, the guide device video data and updated enhancement is presented by the user device, as in 720.

While the above example describes implementations in which the user device utilizes the alignment data to align and concurrently present the guide device video data and the enhancement, in other implementations, the alignment may be performed at the guide and/or by the enhancement service. For example, the enhancement service may align the guide device video data and the enhancement and render a combined digital video that includes the aligned guide device video data and enhancement that is transmitted to the user device for presentation. In such an implementation, the alignment data need not be transmitted to the user device. Likewise, in such an implementation the user may still alter the amount of the presented enhancement, alter the presented enhancement, and/or otherwise interact with the presented information. For example, position information on a user display corresponding to a user input may be recorded and transmitted to the enhancement service and the enhancement service will perform a requested interaction corresponding to the position information. As an illustrative example, the user may provide an input at the position of an adjustment control to adjust the amount of the enhancement that is presented versus the amount of the guide device video data that is presented. The input may be transmitted from the user device to the enhancement service and the enhancement service may correspondingly adjust the rendering of the combined guide device video data and the enhancement.

While the examples discussed above describe the use of the implementations to explore areas such as Pike Place Market and the Roman Coliseum, the implementations discussed herein may likewise be used to explore and/or experience other areas for similar or different purposes. For example, the guide and guide device may be located in a warehouse or factory and transmit audio and video data to a user at a remote location for inspection purposes, or other business purposes. In such examples, enhancement may be aligned and presented concurrently with the guide device video data to provide the user with a mixed reality experience.

Figure 8:
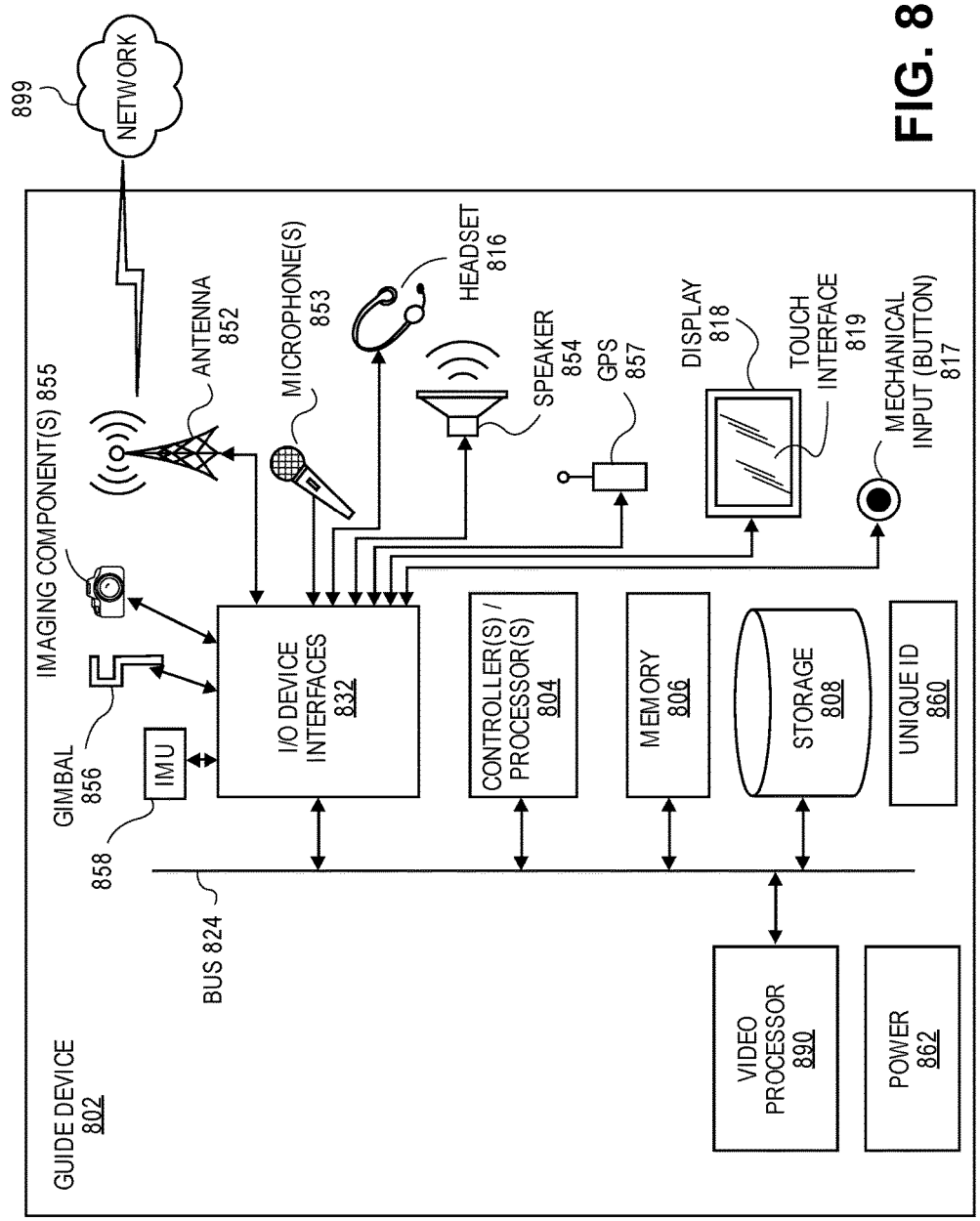
FIG. 8 illustrates an example guide device, according to disclosed implementations.
Figure 9:
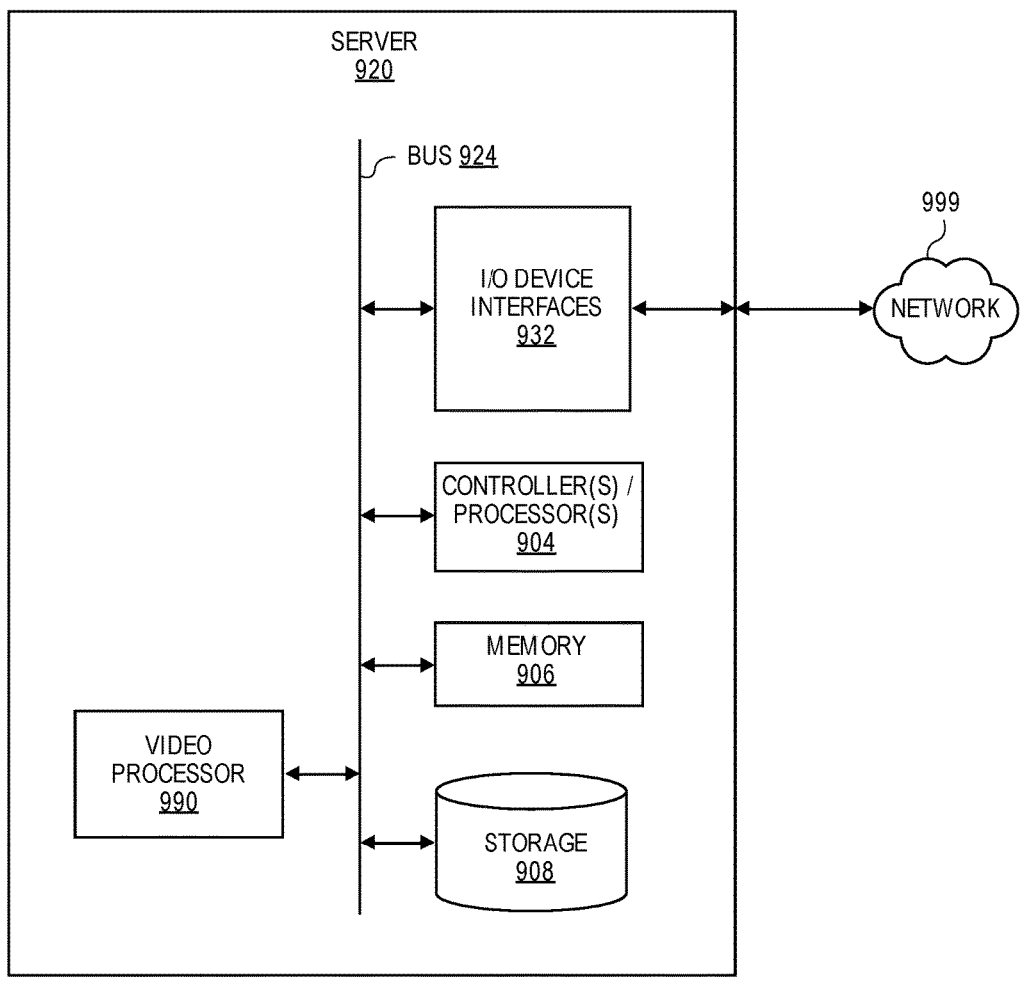
FIG. 9 illustrates example components of a server, according to disclosed implementations.

FIG. 8 is a block diagram conceptually illustrating a guide device 802 that may be used with the described system. FIG. 9 is a block diagram conceptually illustrating example components of a remote device, such as a remote server 920 that may assist with processing, detecting markers in video data, rendering enhancements, generating augmented video data (mixed reality), and the like. Multiple such servers 920 may be included in the system, such as one server(s) 920 for marker detection in video data, one server(s) for processing the video data to generate a homography for use in determining position information for the enhancement to be rendered, one server(s) 920 for rendering the enhancement, etc. In operation, each of these devices (or groups of devices) may include computer-readable and computer-executable instructions that reside on the respective device (802/920), as will be discussed further below.

Each of these devices (802/920) may include one or more controllers/processors (804/904), that may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive (MRAM) and/or other types of memory. Each device may also include a data storage component (808/908), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (832/932).

Computer instructions for operating each device (802/920) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (802/920) includes input/output device interfaces (832/932). A variety of components may be connected through the input/output device interfaces, as will be discussed further below. Additionally, each device (802/920) may include an address/data bus (824/924) for conveying data among components of the respective device. Each component within a device (802/920) may also be directly connected to other components in addition to (or instead of) being connected to other components across the bus (824/924).

Referring to the guide device 802 of FIG. 8, the device 802 may include a display 818, which may comprise a touch interface 819. Alternatively, the device 802 may be "headless" and may primarily rely on spoken commands and/or mechanical inputs (e.g. buttons) for input. For example, as a way of indicating by a guide that a person or other object within a field of view of the imaging component of the guide device 802 is speaking, the guide may provide an indication through a mechanical input 817, such as a mechanical button. As another example, to provide feedback to the guide that a user is interacting with an enhancement and/or that an enhancement is being presented to the user, audible feedback may be output through a speaker 854 and/or through the headset 816 that may be worn by the guide and include a speaker and microphone.

The device 802 also includes an imaging component 855, such as a digital video camera, which may be mounted to the guide, mounted on a gimbal 856 that is held by the guide, etc. The gimbal 856 may be coupled to the input/output device interface 832 and be configured to receive commands from a user that cause the gimbal to rotate or otherwise change the orientation of the field of view of the imaging component 855. Likewise, the imaging component 855 may receive through the input/output interface 832 commands to generate digital images, alter the zoom of the imaging component 855, etc. Likewise, the imaging component 855 provides video data and/or generated digital images through the input/output interface 832 for transmission to the user device and/or the enhancement service, as discussed above. In general, the input/output interfaces 832 between the gimbal 856 and the imaging component 855 provide a user at any location that is communicating with the guide and the guide device 802 the ability to control the field of view of the imaging component 855 and selectively determine the content of the destination location presented to the user.

The guide device 802 may also include input/output device interfaces 832 that connect to a variety of other components such as an audio output component, such as a speaker 854, a wired headset or a wireless headset 816, and/or other components capable of outputting audio. The audio capture component may be, for example, a microphone 853 or array of microphones, a wired headset or a wireless headset, etc. The microphone 853 may be configured to capture audio, such as sounds within the destination location and/or other people or objects within the destination location talking. If an array of microphones is included, approximate distance and direction to a sound's point of origin may be determined using, for example, acoustic localization based on time and amplitude differences between sounds captured by different microphones of the array. Such direction and distance information may be used to determine if a person or object speaking is within a field of view of the imaging component to determine whether presented audio data and video data at the user device needs to be synchronized.

The guide device also includes one or more antennas 852 that connect to one or more networks 899 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, etc. Through the network(s) 899, audio data, video data, enhancement information, etc., may be transmitted to the enhancement service and/or to the user device for presentation by the user device to a user that is communicating with the guide and controlling components of the guide device 802.

The guide device 802 may also include a location component, such as a GPS 857, an indoor positioning system, or other location based component. Likewise, in some implementations, the guide device 802 and/or the server 920 may include one or more video processors 890/990 that are configured to process video data generated by the imagining component 855 of the guide device 802. As discussed above, the video processors 890/990 may process the video data to determine if a maker is present in the video data, to detect objects, to determine position information for enhancements to present with the video data to produce augmented video data, to render enhancements, and/or to generate augmented video data (mixed reality) that includes the video data and the enhancements.

The guide device may also include one or more inertial measurement units (IMU) 858. As is known in the art, an IMU may include an accelerometer, a gyroscope, and/or a compass and provide position information based on the accelerometer, gyroscope and/or compass. In some implementations, an IMU 858 may be included in the gimbal 856 and provide position information indicating an orientation of the imaging component 855 mounted to the gimbal. As another example, an IMU 858 may be included on the imaging component 855 and position information may be provided to indicate a position or orientation of the imaging component 855. In still another example, an IMU 858 may be included on the guide themselves and position information may be provided to indicate a position or orientation of the guide.

Multiple guide devices may be employed in a single system and different users may connect with, communicate with and control different guide devices. As such, each guide device may also include a unique identifier 860. The unique identifier may be any form of unique identification and may be included in video data and/or audio data that is transmitted from the guide device. Likewise, a user device and/or the enhancement service may utilize the unique identifier to enable communication and/or control with the guide device. In such a multi-device system, each of the guide devices may include the same or different components. The components of the guide device 802 and the server 920, as illustrated in FIGS. 8 and 9, are exemplary, and should not be considered limiting to the implementations discussed herein.

The concepts disclosed herein may be applied within a number of different devices and computer systems, including, for example, general-purpose computing systems, video processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, video processing, and augmented reality should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "near," "nearly" or "substantially" as used herein, represent a value, amount, or characteristic close to the stated value, amount, or characteristic that still performs a desired function or achieves a desired result. For example, the terms "about," "approximately," "generally," "near," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
   determining that a guide device is positioned at a first known location within an environment;
   processing guide device video data generated by the guide device while the guide device is positioned at the first known location within the environment to determine a marker represented in the guide device video data, the marker positioned at a second known location within the environment;
   generating alignment data that aligns first pixels of the guide device video data corresponding to the marker with position data of the marker in a visual mapping of the environment such that pixels of the guide device video data are aligned with a representation of the marker within the visual mapping;
   sending, to a user device, the guide device video data, at least a portion of the visual mapping, and the alignment data;
   aligning, based at least in part on the alignment data, second pixels of a portion of the guide device video data that is representative of a first portion of the environment with a first corresponding portion of the visual mapping that is representative of the environment; and
   causing, on the user device, a concurrent presentation of the portion of the guide device video data that is representative of the first portion of the environment and the at least a portion of visual mapping representative of the first corresponding portion of the environment such that the portion of the guide device video data that is representative of the first portion of the environment is presented in alignment with the at least a portion of the visual mapping representative of the first corresponding portion of the environment.

2. The computer-implemented method of claim 1, wherein the visual mapping of the environment includes a representation of the environment corresponding to a different point in time than a point in time at which the guide device video data is generated.

3. The computer-implemented method of claim 1, wherein the visual mapping includes a video representative of the environment.

4. The computer-implemented method of claim 1, further comprising:
   detecting a movement of the guide device from a first position to a second position within the environment;
   determining a second portion of the visual mapping based at least in part on the second position of the guide device;
   sending, for presentation on the user device, the guide device video data corresponding to the second position of the guide device, and at least a portion of the second portion of the visual mapping;
   aligning, based at least in part on the alignment data, third pixels of a second portion of the guide device video data that is representative of a second portion of the environment with a second corresponding portion of the visual mapping that is representative of the environment; and
   causing, on the user device, a concurrent presentation of the second portion of the guide device video data that is representative of the second portion of the environment and the at least a portion of the visual mapping representative of the second corresponding portion of the environment such that the second portion of the guide device video data is presented in alignment with the at least a portion of the visual mapping representative of the second corresponding portion of the environment.

5. A mixed reality system, comprising:
one or more processors;
a memory coupled to the one or more processors and storing program instructions that when executed by the one or more processors cause the one or more processors to at least:
   determine that a guide device is at a known location within an environment;
   receive at a remote computing resource and from an imaging component of a guide device while the guide device is at the known location, guide device video data representative of the environment;
   process, at the remote computing resource, the guide device video data to detect a marker within the guide device video data;
   determine, at the remote computing resource, based at least in part on the marker and the known location, a first position and a first orientation of the guide device;
   generate, at the remote computing resource, alignment data that aligns an enhancement corresponding to the environment with the guide device video data based at least in part on the first position and first orientation of the guide device; and
   send, from the remote computing resource and to a user device that is different than the guide device, at least one of the guide device video data, the alignment data, or the enhancement to cause, based at least in part on the alignment data, a concurrent presentation by the user device of a first portion of the guide device video data and a first portion of the enhancement such that a first representation of the environment included in the guide device video data and a second representation of the environment in the enhancement are aligned.

6. The mixed reality system of claim 5, wherein the program instructions further cause the one or more processors to at least:
   cause, at the user device, a concurrent presentation of a head's up display with the guide device video data and the enhancement.

7. The mixed reality system of claim 5, wherein the enhancement is a two-dimensional representation of the environment at a point in time.

8. The mixed reality system of claim 5, wherein the program instructions further cause the one or more processors to at least:
   receive from the user device an input to alter an amount of the enhancement presented by the user device; and
   cause a second concurrent presentation by the user device that includes a second portion of the enhancement and a second portion of the guide device video data such that the first representation of the environment included in the guide device video data and the second representation of the environment in the enhancement are aligned.

9. The mixed reality system of claim 5, wherein program instructions that generate the alignment data further cause the one or more processors to at least:
   determine first pixels of the guide device video data corresponding to the marker;
   determine a corresponding position of the marker in the enhancement; and
   generate the alignment data based on the first pixels and the corresponding position.

10. The mixed reality system of claim 9, wherein the program instructions further cause the one or more processors to at least:
   determine second pixels of the guide device video data corresponding to a second marker;
   determine a second corresponding position of the second marker in the enhancement; and
   generate the alignment data further based on the second pixels and the second corresponding position.

11. The mixed reality system of claim 5, wherein the program instructions further cause the one or more processors to at least:
   generate alignment data for a plurality of pixels of the guide device video data that aligns each of the plurality of pixels with a respective position of the enhancement.

12. The mixed reality system of claim 5, wherein the program instructions further cause the one or more processors to at least:
   detect a movement of the guide device from the first position to a second position;
   send a second portion of the enhancement to the user device that corresponds to video data generated by the guide device when the guide device is at the second position; and
   cause, based at least in part on the alignment data, a concurrent presentation by the user device, guide device video data and the second portion of the enhancement such that a second representation of the environment included in the guide device video data and a second representation of the environment in the second portion of the enhancement are aligned.

13. The mixed reality system of claim 5, wherein the enhancement is overlaid on the guide device video data as it is presented concurrently by the user device.

14. The mixed reality system of claim 5, wherein:
   the enhancement of the environment is representative of the environment at a first time that is different than a second time at which the guide device video data is generated.

15. The mixed reality system of claim 5, wherein:
   the enhancement includes at least one of a historical representation of the environment, a representation of what the environment could have looked like, or a future representation of the environment.

16. A system, comprising:
a guide device, including:
   a camera; and
   a wireless transmitter;
an enhancement service executing on one or more processors remote from the guide device and causing the one or more processors to at least:
   receive from the guide device, guide device video data generated by the camera and wirelessly transmitted from the guide device by the wireless transmitter;
   process the guide device video data to detect a marker represented in the guide device video data;
   determine, based at least in part on the marker, a position of the camera;
   generate alignment data based at least in part on the position of the camera and a visual mapping of an environment in which the guide device is located; and
   transmit to a user device for presentation, at least one of the visual mapping, the alignment data, or the guide device video data, wherein the user device aligns and presents the guide device video data and the visual mapping based at least in part on the alignment data.

17. The system of claim 16, wherein the enhancement service further causes the one or more processors to at least:
receive from the guide device an indication that the guide device is at a known location within the environment; and
wherein the received guide device video data is generated by the camera while the guide device is at the known location.

18. The system of claim 17, wherein:
a distance between the known location and the marker are known by the enhancement service;
a direction of the marker from the known location is known by the enhancement service; and
a size of the marker is known by the enhancement service.

19. The system of claim 16, wherein processing the guide device video data further includes:
processing the guide device video data to determine the marker based at least in part on a size of the marker, a shape of the marker, or a color of the marker.

20. The system of claim 16, wherein the guide device further includes:
a global positioning system (GPS) receiver indicating a position of the guide device as determined by the GPS receiver; and
wherein the position of the camera is further based at least in part on the position of the guide device as determined by the GPS receiver.

21. A method, comprising:
processing guide device video data generated by a guide device to determine a marker represented in the guide device video data, the marker positioned at a known location within an environment;
generating alignment data that aligns the guide device video data corresponding to the marker with position data of the marker in a visual mapping of the environment; and
send, for presentation by a device that is remote from the environment, at least a portion of the guide device video data and at least a portion of the visual mapping of the environment such that the at least a portion of the guide device video data and the at least a portion of the visual mapping of the environment are aligned in the presentation.

22. The method of claim 21, further comprising:
determining that the guide device is positioned at a first known location within the environment; and
wherein the guide device video data is generated by the guide device while the guide device is positioned at the first known location.

23. The method of claim 21, further comprising:
receiving, at a computing resource that is remote from the guide device, the guide device video data; and
wherein the processing and generating are performed at the remote computing resource.

24. A system, comprising:
an enhancement service executing on one or more processors and causing the one or more processors to at least:
receive from a guide device, video data of an environment generated by a camera of the guide device while the guide device is at a location within the environment
process the video data received from the guide device to detect a marker represented in the video data, the marker positioned at a known location within the environment;
generate alignment data based at least in part on the known location of the marker and a visual mapping of the environment represented in the video data; and
transmit to a user device for presentation, at least one of the visual mapping, the alignment data, or the video data, wherein the user device aligns and presents the video data and the visual mapping based at least in part on the alignment data.

25. The system of claim 24, wherein the enhancement service is configured to cause the one or more processors to at least:
determine, based at least in part on the marker, a position of the guide device when the video data was generated.

* * * * *